Patented Feb. 3, 1948

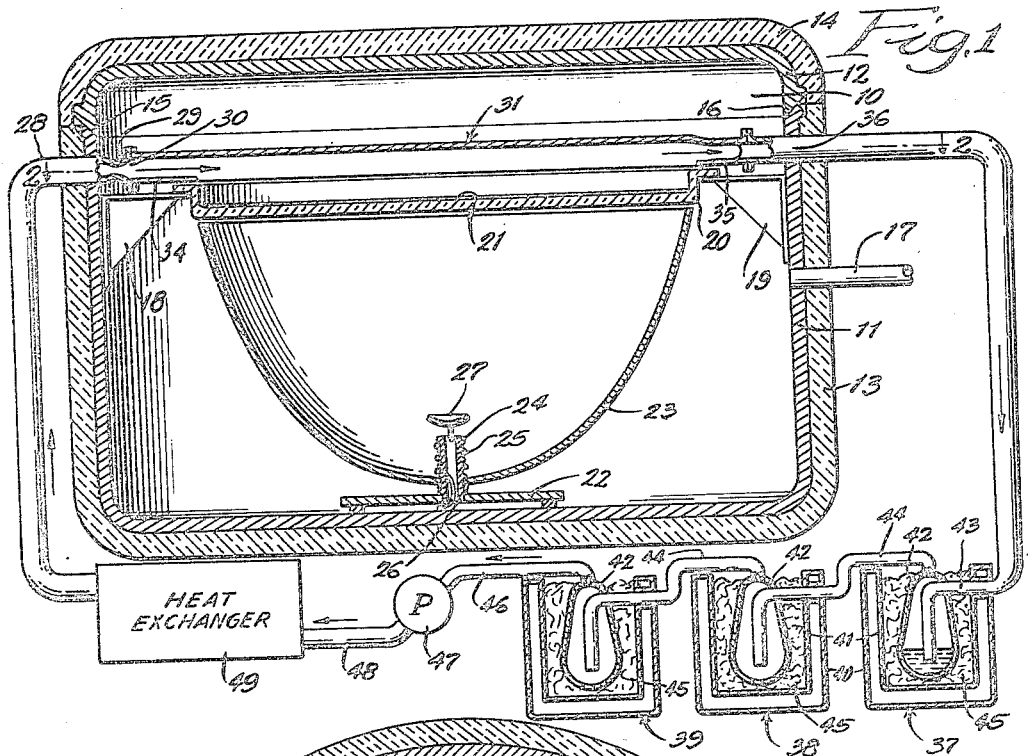
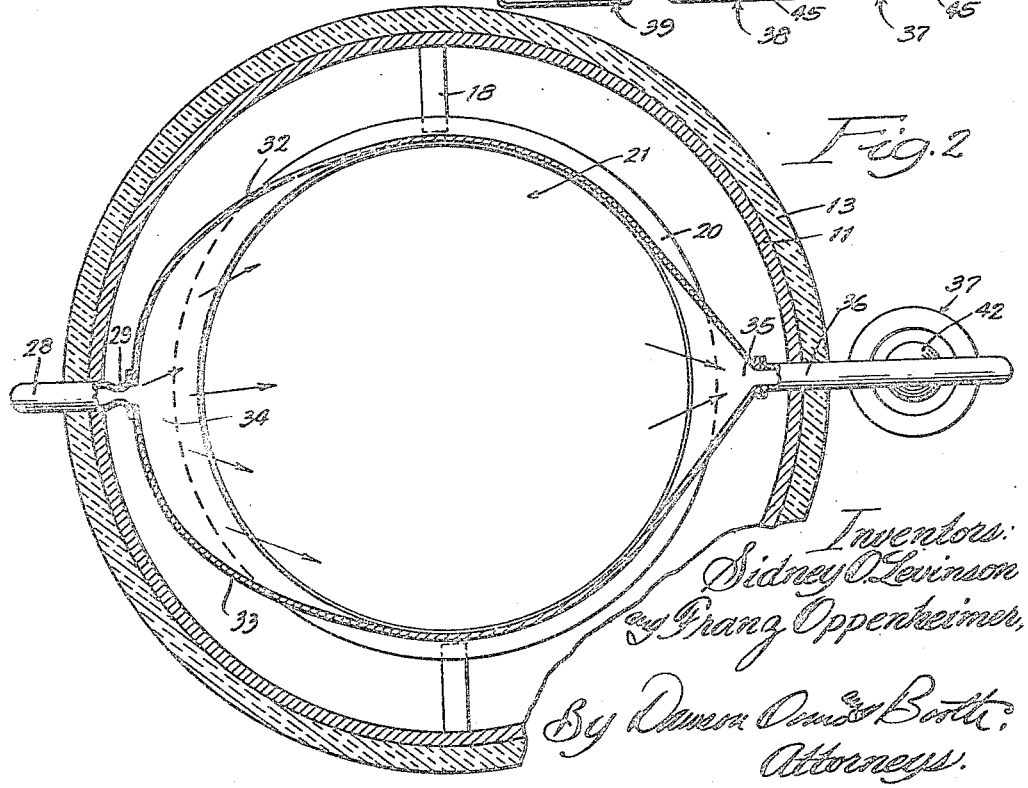

2,435,503

UNITED STATES PATENT OFFICE 2,435,503

DRYING OF FROZEN MATERIALS

Sidney O. Levinson and Franz Oppenheimer, Chicago, Ill., assignors to Michael Reese Research Foundation, a corporation of Illinois Application September 30, 1943, Serial No. 504,412

1 Claim. (Cl. 34—5)

This invention relates to the drying of frozen materials, and more particularly to a method and apparatus for rapidly and efficiently drying materials containing frozen water.

An object of the invention is to dry substances which at normal temperatures contain water in the liquid phase, such as the juices of fruits, vegetables, and the like, and particularly the citrus fruit juices, other foods, such as milk and eggs, plasma, biological substances, and pharmaceuticals without deleteriously affecting the same. Such substances are often relatively unstable and may be changed from their original taste, odor, flavor or chemical composition when subjected to conventional drying processes. In accordance with the present invention, such substances may be dried from the frozen state, and without any change in taste, flavor, odor or chemical composition of the substance, while at the same time the process may be carried out rapidly and efficiently.

Another object of the invention is to prepare dried products of relatively unstable substances, such as orange juice and the juices of fruits and vegetables, milk, pharmaceuticals and biologicals, and the like, which may be readily reconstituted upon the addition of water to the dry product. Another object is to provide a method and apparatus for removing the water from such substances while maintaining them in the solid state so that the water is removed without melting the material.

Another object of the invention is to utilize the circulation of a dry gas in rapidly removing the water from a material containing frozen water. Still another object is to carry out the rapid removal of the water without necessarily using high vacuum or extremely low temperatures in the process. Yet another object is to impart heat to the frozen water in the material to provide heat for vaporization of the water and balancing the quantity of heat imparted against the speed of removal of the water vapor so that the frozen water which is being vaporized will not be raised to a temperature at which it might melt. A further object is to impart heat to the surface of the frozen water from which the vapors are being removed in combination with the use of an inert gas in carrying away the water vapor by washing or entrainment. Yet another object is to subject the frozen water in the material to a penetrating type of heat, such as is provided by radiant energy.

The invention is illustrated in the drawings, in which—

Fig. 1 is a vertical sectional view of an apparatus in which the drying operation may be performed; and Fig. 2 is a horizontal sectional view taken on the line 2—2 of Fig. 1.

The invention contemplates the efficient and effective drying of frozen materials by passing a dry gas along the surface of the frozen water in the material to carry away the water vapor by entrainment and in which heat is simultaneously imparted to the frozen water, preferably in the form of a penetrating heat, such as that obtained from infra-red rays. The heat imparted is sufficient to cause rapid vaporization of the frozen water without raising the temperature of the water sufficiently to cause it to melt. Although the process may be carried out under vacuum and low temperature conditions, extremely high vacuum and low temperatures are not necessary. Of course, the water must be maintained in the frozen state throughout the entire operation of the process.

In the apparatus shown in the drawing in which the invention is illustrated, a chamber 10 is formed by a casing 11 which may be of metal or the like and a closure 12 of similar material. The chamber 10 provides a drying zone, and preferably the casing 11 and closure 12 are equipped with insulating material about the outer surfaces thereof as indicated by the insulating layers 13 and 14. The chamber 10 is preferably airtight. Any suitable type of joint, such as the beveled joints 15 and 16, may be provided in forming the airtight chamber. A conduit 17 communicating with the interior of the chamber 10 may be connected to a source of vacuum so as to evacuate the chamber when desired.

A pair of brackets 18 and 19 mounted on opposite sides of the casing 11 may be used to support a tray 20 of glass or other transparent material. The glass tray 20 may receive a very thin layer 21 of the frozen material or material containing the frozen water, which is to be dried. Preferably, the tray 20 is removably supported upon the brackets 18 and 19 so that the tray may be withdrawn from the chamber 10 and, if desired, the material which is to be dried may be placed in the tray and frozen therein before the tray is placed within the chamber.

Any suitable means for imparting heat to the material within the tray may be used. Preferably, as indicated, a source of infra-red rays is placed below the glass tray so that the infra-red rays pass through the glass tray and penetrate and heat the frozen material 21 therein.

The casing 11 may be provided with a platform 22 which supports a parabolic reflector 23. An insulating member 24 extends upwardly from the lower portion of the reflector 23. Electrical resistance wires in the form of a small coil 25 may be wound about the insulating member 24. The wire may consist of Chromel or Nichrome wire or other suitable resistance wire for generating infra-red rays upon the passage of an electrical current therethrough. Electrical connections 26 are connected to the coil 25 and to a suitable source of electrical current. A small deflector 27 is mounted on the top of the insulating member so as to prevent the bulk of the rays from generating directly upwardly to the tray. When an electrical current is passed through the coil 25, the coil is heated and infra-red rays are generated. These rays are reflected by the parabolic reflector 23 and pass upwardly through the glass tray 20 to the frozen material 21. By reason of the parabolic reflector, the rays which pass upwardly are disposed in substantially parallel relation.

The casing 11 is equipped with an inlet conduit 28 for introducing a dry gas into the chamber. The conduit may be provided with a Venturi passage 29 which leads to a large opening 30.

A shield 31 preferably extends over the surface of the tray 20 and is secured to the conduit 28 of the enlarged opening 30. The shield may be equipped with side walls 32 and 33 and with a bottom wall 34 adjacent the gas inlet. The shield thus provides a conduit for distributing the gas over the surface of the material in the tray 20, as indicated by the arrows in Fig. 2. At its other side, the shield 31 may be equipped with a bottom wall 35 which leads to and communicates with an outlet conduit 36. Preferably, the shield 31 is removably attached to the inlet conduit 28 and outlet conduit 36 so that it may be removed for the removal of the tray. The tray 20 and the shield 31 do not provide an airtight connection between them, and the vacuum conduit 17, in establishing reduced pressure within the chamber 10, also establishes a correspondingly reduced pressure in the area between the shield 31 and tray 20.

The outlet conduit 36 communicates with successive traps 37, 38 and 39 for condensing the water in the gas passing through the conduit.

The trap 37, for example, may include a casing having spaced walls 40 and 41 providing an insulating area about the trap. A container 42 may be equipped with an inlet 43 communicating with the conduit 36 and an outlet 44 communicating with the trap 38. Between the container and the inner wall 41 of the trap 37, a refrigerating medium 45, such as ice or the like, may be placed.

The traps 38 and 39 may be substantially identical with the trap 37 and need not be described in detail. Preferably, the traps 37, 38 and 39 are maintained at successively lower temperatures so as to effectively remove in successive steps any water vapor within the gas which is passed through the traps. For example, the trap 37 may have a refrigerating medium maintained at a temperature of approximately 5° F. The refrigerating medium in the trap 38 may be maintained at a temperature of —20° F., while the medium in the trap 39 may be maintained at a temperature of —60° F.

A conduit 46 from the trap 39 is connected to a pump 47 for increasing the velocity of the gas within the system, and the pump 47 in turn is connected by the conduit 48 to the heat exchange unit 49. The inlet conduit 28 for the chamber 10 is connected to the heat exchange unit 49 so that the gas which is withdrawn from the chamber 10 may be recirculated.

The pump 47 may be of any suitable type or character. If the system is maintained at a very low pressure, such as a pressure of a few millimeters of mercury or less, a molecular pump of conventional type will probably be used. If the pressure is somewhat higher, such as a pressure of 10 mm. to 20 mm., a high vacuum rotary pump may be used. In the case of relatively high pressure approaching atmospheric pressure, a turbine or any suitable type of blower may be used. In general, the type of pump used may be varied according to the conditions which are desired.

The heat exchanger 49 may be of any suitable character. Any conventional unit for increasing or decreasing the temperature of the gas may be used for this purpose.

In operation, the frozen material 21 is placed in the tray 20, and the tray is mounted on the brackets 18 and 19 within the casing 11. The closure 12 is placed in position and the chamber 10 is thus closed and sealed. By means of the vacuum outlet 17, the chamber may then be evacuated.

A dry gas, which is inert and does not react with the material 21 containing the frozen water, is passed across the surface of the frozen material by passing the dry gas from the inlet conduit 28 through the Venturi passage 29, the enlarged opening 30, and through the shield or guide 31. The velocity of the dry gas is preferably maintained at as high a point as possible. As the gas passes across the surface of the material containing the frozen water, the water vapor is carried away in the gas by entrainment and the gas carrying the water reaches the outlet conduit 36.

The moisture-laden gas may be dried and recirculated. As illustrated, the conduit 36 communicates with the trap 37 so the moisture-laden gas may be passed from the conduit 36 through the successive traps 37, 38 and 39. By maintaining the traps at successively lower temperatures, the water is effectively removed from the gas. At the same time, with this construction the bulk of the water is removed in the first trap which is maintained at a relatively high temperature and does not require extensive refrigeration.

From the trap 39, the gas which is now dried passes to the pump 47 where the increased velocity is imparted to it. The gas then passes through the heat exchanger 49 in which the gas is brought to the desired temperature. Then the gas is returned to the inlet conduit 28 and again passes into the chamber 10.

While the gas is being passed over the surface of the material 21 containing the frozen water, the material is heated by passing an electrical current through the resistance element 25 to generate infra-red rays which are reflected from the parabolic reflector to and through the tray 20. The infra-red rays are absorbed by a layer of frozen material 21 and the material is thus heated.

The quantity of heat which is imparted to the material is balanced with the rate of removal of the water vapor which is about the material from contact with the surface thereof. In this manner, the heat which is imparted to the material provides the heat of vaporization of the frozen water without raising the temperature of the material to the melting point.

In the use of infra-red rays for heating the material, it is preferred that the rays be of the type having a maximum intensity in the range of wavelengths between $7\mu$ and $1\mu$ and the range of between $5\mu$ and $2.5\mu$ is particularly desirable. Infra-red rays of this latter range are the equivalent of those generated by a hot body over the range of temperature between 300° C. and 800° C. The letter $\mu$ as used herein means of a wavelength of one micron.

Instead of infra-red rays, other types of radiant energy may be used to heat the material.

A method of imparting heat to the material which is also very desirable is by means of the gas itself which is passed across the surface of the material. Thus, the gas may be heated to a temperature substantially above the temperature of the frozen material. For example, gas at a temperature of 4° C. to 50° C. may be used. By means of the use of the gas, the heat is imparted to the surface of the material at which the vaporization takes place.

Any dry gas may be used to carry away the water vapor from the frozen material. Preferably, the gas is also one which is inert and does not react chemically with the material. For example, hydrogen, helium, nitrogen, argon, etc. may be used. With materials which are not reactive with oxygen, air may be used. The gas should be relatively dry so as to sweep away the water vapor which is about the material from contact with the surface thereof. By relatively dry is meant that the quantity of water vapor, if any, in the gas should be substantially less than the quantity of water vapor about the surface of the frozen water. This may also be expressed by stating that the partial pressure of the water vapor within the gas should be substantially less than the partial pressure of the water vapor at the surface of the frozen water. The lower the water content of the gas, the more effective is its use, and therefore it is preferred to use a gas which is substantially dry.

The temperature of the gas may be readily controlled in the heat exchanger through which the gas is recirculated. This heat exchanger, which may be of any conventional type, may be used to lower or raise the temperature of the gas as desired. In some instances, it may be desirable to lower the temperature of the gas to a temperature as low or lower than that of the frozen water. However, if the gas is to be used to impart heat to the frozen water, this temperature should be very substantially above that of the frozen water.

The speed at which the operation is to be carried out varies with the quantity of the inert gas which is passed across the surface of the material, the velocity at which the gas moves, and the surface of the frozen material which is exposed. In general, the greater quantity of gas which is used and the greater its velocity, the more rapid will be the evaporation or vaporization. Similarly, the material to be dried is preferably arranged so as to provide a maximum of surface exposure to the gas which is passed across the same.

The operation may be carried out at a suitable total pressure within the drying zone provided by the chamber 10. In general, the total pressure which is permissible in the drying zone depends upon the rate of circulation of the inert gas and the resultant rapidity of removal of water from the material to be dried. As an example, a pressure of 20 mm. mercury has been found to be effective in the drying operation, and at this pressure the material may be dried very rapidly while maintained in the frozen state.

Although normally the rate at which heat is imparted to the frozen material must be controlled and balanced with the rate of removal of water from the material so as to maintain the material in the frozen state, if the total pressure within the drying zone is maintained at less than 4 mm. mercury, the approximate vapor tension of ice at 0° C., then so long as this low pressure is maintained, the material will not melt even though heat be imparted to it very rapidly. In this case, the control of the pressure within the drying zone serves to control the sublimation to prevent melting of the material. Of course, when operating at such a low total pressure, the density of the gas is relatively low, and the entrainment action of the inert gas which is circulated over the material is somewhat limited. Accordingly, rapid circulation of the gas is necessary in order to remove the water vapor which is formed and prevent the total pressure from increasing above 4 mm. mercury. Moreover, as the rate of imparting heat to the material is increased, the rate of circulation of the gas must be correspondingly increased in order to maintain the total pressure below the 4 mm. level.

As an illustration of the invention, in a specific laboratory drying operation, approximately 50 cc. water were frozen on a surface approximately 10 c. in diameter. The chamber as maintained at a total pressure of about 10 mm., and dry nitrogen gas at 25° C. was passed across the surface of the frozen material at the rate of 50 liters per minute. While the gas was passed across the surface of the material, additional heat was imparted to the material by infra-red rays generated by 10 watts of electrical current. The frozen water was thus maintained at a temperature of —10° C., and in one hour approximately 14 cc. of water were evaporated.

The invention is applicable to the drying of any materials in which the water may be frozen and maintained in the frozen state during the drying operation. It is particularly valuable for pharmaceuticals, such as plasma and the like, for citrus fruit juices, such as orange juice, and for food products, such as milk and eggs, but is obviously of much wider applicability and may be used with many different types of substances.

Although the invention has been illustrated in connection with a specific embodiment, it will be apparent that modifications and changes may be made without departing from the spirit and scope of the invention.

We claim:

A method of drying materials containing frozen water, comprising passing a relatively dry inert gas across the surface of said material in a drying chamber to remove water vapor about said material from contact with the surface of the frozen water whereby frozen water in said material is converted to the vapor state without being melted, subjecting the material in said chamber to radiant energy to impart heat thereto to vaporize the frozen water, subjecting the chamber and the material therein to a total pressure of less than 4 mm. mercury, withdrawing moisture-laden gas from said zone, removing water from the withdrawn gas, recirculating the gas after the removal of water therefrom, and again passing the gas across the surface of said material.

SIDNEY O. LEVINSON.
FRANZ OPPENHEIMER.

REFERENCES CITED

The following references are of record in the file of this patent:

UNITED STATES PATENTS

| Number | Name | Date |
| --- | --- | --- |
| 2,172,059 | Chilton | Sept. 5, 1939 |
| 1,458,403 | Glessner | June 12, 1923 |
| 2,292,447 | Irwin, Jr. | Aug. 11, 1942 |
| 2,333,850 | Dunkley | Nov. 9, 1943 |
| 1,771,139 | Novotny | July 22, 1930 |
| 1,225,212 | Benjamin | May 8, 1917 |
| 1,284,218 | Benjamin | Nov. 12, 1918 |
| 2,354,200 | Cutler | July 25, 1944 |
| 2,060,389 | Wigelsworth | Nov. 10, 1936 |

FOREIGN PATENTS

| Number | Country | Date |
| --- | --- | --- |
| 163,549 | Great Britain | May 26, 1921 |
| 12,642 | Great Britain | 1905 |

OTHER REFERENCES

"Infra-Red Does the Trick," by A. P. Peck, pages 124 to 127 of Scientific American, September 1941.

"Infra-Red Radiation," pages 229 and 230 of the March 4, 1944, issue of The Chemical Age, vol. L, No. 1288.